United States Patent
Schulze-Isfort et al.

(10) Patent No.: US 8,071,070 B2
(45) Date of Patent: Dec. 6, 2011

(54) TITANIUM DIOXIDE HAVING A VARIABLE SINTERING STABILITY

(75) Inventors: Christian Schulze-Isfort, Limeshain (DE); Kai Schumacher, Hofheim (DE); Nina Schuhardt, Ringheim (DE); Oswin Klotz, Westerngrund (DE); Rainer Golchert, Dieburg (DE)

(73) Assignee: Evonik Degussa GmbH, Essen (DE)

( * ) Notice: Subject to any disclaimer, the term of this patent is extended or adjusted under 35 U.S.C. 154(b) by 0 days.

(21) Appl. No.: 12/786,195

(22) Filed: May 24, 2010

(65) Prior Publication Data

US 2010/0234218 A1    Sep. 16, 2010

Related U.S. Application Data

(62) Division of application No. 12/125,531, filed on May 22, 2008, now abandoned.

(60) Provisional application No. 60/940,272, filed on May 25, 2007.

(30) Foreign Application Priority Data

May 22, 2007  (EP) .................................... 07108639

(51) Int. Cl.
  *C01G 23/07* (2006.01)
  *C01G 23/047* (2006.01)
(52) U.S. Cl. ......... 423/613; 423/610; 423/611; 423/612
(58) Field of Classification Search ........... 423/610–616
See application file for complete search history.

(56) References Cited

U.S. PATENT DOCUMENTS 5,861,132 A    1/1999  Pratsinis et al.

FOREIGN PATENT DOCUMENTS

| DE | 10 2004 055 165 | 6/2005 |
|---|---|---|
| EP | 1 243 555 | 9/2002 |
| EP | 1 354 854 | 10/2003 |
| JP | 10-251021 | 9/1998 |
| WO | 2005054136 A1 | 6/2005 |

OTHER PUBLICATIONS

Bacsa, et al., "Effect of rutile phase on the photocatalytic properties of nanocrystalline titania during the degredation of p-coumaric acid", Applied Catalysis B: Environmental, vol. 16, pp. 19-29, 1998.
Akurati, et al., "Synthesis of non-aggregated titania nanoparticles in atmospheric pressure diffusion flames", Powder Technology, Elsevier Sequoia, vol. 165, pp. 73-82, 2006.
Pratsinis, Sotiris E., "The role of gas mixing in flame synthesis of titania powders", Power Technology 86 (1996), pp. 87-93.

*Primary Examiner* — Stanley Silverman
*Assistant Examiner* — Brian Walck
(74) *Attorney, Agent, or Firm* — Oblon, Spivak, McClelland, Maier & Neustadt, L.L.P.

(57) ABSTRACT

Provided is a crystalline $TiO_2$ powder in the form of aggregated primary particles having a variable sintering stability at a BET surface area of 70-100 $m^2/g$ and a rutile content of greater than 10% but less than or equal to 40%, and a process for preparing the crystalline $TiO_2$ powder, which involves: introducing a $TiCl_4$ vapor and, separately therefrom, $H_2$ and a primary air into a mixing chamber to produce a gaseous mixture; igniting the gaseous mixture in a burner to produce a flame, which is burned into a reaction chamber to produce the crystalline $TiO_2$ powder and gaseous substances; and separating the crystalline $TiO_2$ powder from the gaseous substances, wherein the relative amounts of $TiCl_4$ vapor, $H_2$ and primary air are selected to provide crystalline $TiO_2$ powder having the aforementioned BET surface area and rutile content, with the proviso that factor A has a value of 0.1-0.4 $g/m^2$ in accordance within the following formula: factor $A=10^5\{[(TiCl_4\ vapor \times H_2)/(amount\ of\ air \times gaseous\ mixture)]/BET\}$.

20 Claims, No Drawings

TITANIUM DIOXIDE HAVING A VARIABLE SINTERING STABILITY

CROSS-REFERENCE TO RELATED APPLICATIONS

The present application is a divisional of U.S. patent application Ser. No. 12/125,531, filed on May 22, 2008, which claims priority to U.S. provisional patent application 60/940,272, filed on May 25, 2007, and European patent application EP 07108639.1, filed on May 22, 2007, which are incorporated herein by reference in their entireties.

BACKGROUND OF THE INVENTION

1. Field of the Invention

The present invention relates to a crystalline titanium dioxide powder having a variable sintering stability, a process for preparing the crystalline titanium dioxide powder, and a catalyst and/or a catalyst support comprising the crystalline titanium dioxide powder.

2. Discussion of the Background

Titanium dioxide may be produced by pyrogenic processes including flame oxidation and/or flame hydrolysis. In flame oxidation, a titanium dioxide precursor (e.g., titanium tetrachloride) is oxidized with oxygen according to the following equation (1). In flame hydrolysis, titanium dioxide is formed by hydrolysis of the titanium dioxide precursor, with the requisite water for hydrolysis obtained from combustion of a fuel gas (e.g., hydrogen) with oxygen according to the following equation (2).

$$TiCl_4 + O_2 \rightarrow TiO_2 + 2Cl_2 \quad (1)$$

$$TiCl_4 + 2H_2O \rightarrow TiO_2 + 4HCl \quad (2)$$

Titanium dioxide is generally present in the crystalline forms of anatase and rutile. In the references described below, the primary focus is on maximizing the proportion of anatase.

WO 96/06803 describes a process for preparing titanium dioxide by a combination of flame oxidation and flame hydrolysis. Gaseous titanium tetrachloride and oxygen are mixed in a reaction zone and the mixture is heated in a flame produced by combustion of a hydrocarbon as a fuel gas. Titanium dioxide powder having a BET surface area of about 70-110 $m^2/g$ and a rutile content of less than 10% is described.

Powder Technology, Vol. 86, No. 3, pp. 87-93 (March 1996) describes a flame oxidation process carried out in a diffusion reactor. No rutile is detected in a BET surface area of about 80-120 $m^2/g$.

DE-A-102004055165 describes a titanium dioxide powder that is prepared by flame hydrolysis and has a BET surface area of 20-200 $m^2/g$. Although the anatase/rutile ratio is said to be able to be varied in a range from 2:98 to 98:2 at a given BET surface area, the examples show that the proportion of anatase clearly dominates. In a BET surface area of about 70-100 $m^2/g$, the anatase content is at least 90%.

JP-A-10251021 describes three titanium dioxide powders obtained by flame oxidation, wherein the three titanium dioxide powders have a BET surface area of 3.2 $m^2/g$, 28 $m^2/g$ and 101 $m^2/g$ and a rutile content of 97%, 32% and 15%, respectively.

As evidenced by the aforementioned references, there is a pronounced interest in pyrogenically produced titanium dioxide and the complex processes associated therewith.

SUMMARY OF THE INVENTION

The present invention relates to a crystalline titanium dioxide powder having a variable sintering stability, a process for preparing the crystalline titanium dioxide powder, and a catalyst and/or a catalyst support comprising the crystalline titanium dioxide powder.

An exemplary aspect of the present invention is to provide a crystalline titanium dioxide powder having a sintering stability that can be varied at a given BET surface area and a given rutile content.

Another exemplary aspect of the present invention is to provide a crystalline titanium dioxide powder in the form of aggregated primary particles having a variable sintering stability at a BET surface area of 70-100 $m^2/g$, preferably 80-90 $m^2/g$, and a rutile content of greater than 10% but less than or equal to 40%, preferably 16-30%. In the context of the present invention, it is understood that a variable sintering stability is represented by titanium dioxide particles that aggregate during and/or after sintering to form larger particles thereby resulting in a decreased BET surface area. Representative ranges of decreased BET surface areas that constitute a variable sintering stability in accordance with the present invention include a decrease in the BET surface area of 10-90%, 15-85%, 20-80%, 25-75%, 30-70%, 35-65%, 40-60% and 45-55%, preferably 15-50%, based on the original BET surface area before sintering.

Another exemplary aspect of the present invention is to provide a process for preparing the crystalline $TiO_2$ powder, wherein the process comprises: introducing a $TiCl_4$ vapor and, separately therefrom, $H_2$ and a primary air into a mixing chamber to produce a gaseous mixture; igniting the gaseous mixture in a burner to produce a flame, which is burned into a reaction chamber to produce the crystalline $TiO_2$ powder and gaseous substances; and separating the crystalline $TiO_2$ powder from the gaseous substances, wherein the relative amounts of $TiCl_4$ vapor, $H_2$ and primary air are selected to provide crystalline $TiO_2$ powder having the aforementioned BET surface area and rutile content, with the proviso that factor A has a value of 0.1-0.4 $g/m^2$ in accordance within the following formula: factor $A = 10^5 \{[(TiCl_4 \text{ vapor} \times H_2)/(\text{amount of air} \times \text{gaseous mixture})]/BET\}$.

Another exemplary aspect of the present invention is to provide a catalyst and/or a catalyst support comprising the crystalline titanium dioxide powder.

The foregoing discussion exemplifies certain aspects of the present invention. Additional exemplary aspects of the present invention are discussed in the following detailed description of the invention.

DETAILED DESCRIPTION OF THE INVENTION

Unless specifically defined, all technical and scientific terms used herein have the same meaning as commonly understood by a skilled artisan in the relevant technological field (e.g., inorganic chemistry, chemical engineering, etc.).

All processes, materials and examples similar or equivalent to those described herein can used in the practice or testing of the present invention, with suitable processes, materials and examples being described herein. Accordingly, the processes, materials and examples described herein are for illustrative purposes only and are therefore not intended to be limiting, unless otherwise specified.

All patent applications, patent application publications, patents, scientific and technological literature, publications and references specifically mentioned herein are hereby incorporated by reference in their entirety. In case of conflict, the present specification, including definitions set forth herein, are controlling.

Where a closed or open-ended numerical range is described herein, all values and subranges within or encompassed by the numerical range are specifically included as belonging to the original disclosure of the present application as if these values and subranges had been explicitly written out in their entirety.

The present invention provides a crystalline titanium dioxide powder in the form of aggregated primary particles having a variable sintering stability at a BET surface area of 70-100 m$^2$/g and a rutile content of greater than 10% but less than or equal to 40%.

In the context of the present invention, it is understood that a variable sintering stability is represented by titanium dioxide particles that aggregate during and/or after sintering to form larger particles thereby resulting in a decreased BET surface area. Representative ranges of decreased BET surface areas that constitute a variable sintering stability in accordance with the present invention include a decrease in the BET surface area of 10-90%, 15-85%, 20-80%, 25-75%, 30-70%, 35-65%, 40-60% and 45-55%, preferably 15-50%, based on the original BET surface area before sintering.

The BET surface area of the crystalline titanium dioxide powder is 70-100 m$^2$/g, 75-95 m$^2$/g or 80-90 m$^2$/g. The BET surface area of the crystalline titanium dioxide powder is preferably 80-90 m$^2$/g.

The rutile content of the crystalline titanium dioxide powder is greater than 10% but less than or equal to 40%, 15-35% or 20-30%. The rutile content of the crystalline titanium dioxide powder is preferably 16-30%. The rutile content is based on the percentage of crystalline rutile relative to the sum of the crystalline forms of rutile and anatase which add up to 100%. Aside from rutile and anatase, the crystalline titanium dioxide powder having a variable sintering stability in accordance with the present invention generally does not contain further crystalline forms of titanium dioxide (e.g., titanium dioxide (B) or brookite) that can be detected in X-ray diffraction patterns.

The present invention also provides a crystalline titanium dioxide powder in the form of aggregated primary particles having a variable sintering stability at a BET surface area of 80-90 m$^2$/g and a rutile content of 16-30%.

Primary particles are understood to include particles that are initially formed in the reaction, which can subsequently grow together to form aggregates during the course of the reaction. Aggregates are understood to include primary particles of similar structure and size that have grown together, with the surface area of the aggregate being smaller than that of the sum of the surface areas of the individual, isolated primary particles. A plurality of aggregates and/or individual primary particles can also be combined to form agglomerates, wherein the aggregates and/or primary particles are in point contact with one another. Agglomerates can be broken up by the introduction of energy as a function of the degree to which the aggregates and/or particles are combined.

The proportion of aggregates and/or agglomerates having an average particle diameter of more than 45 μm in the crystalline titanium dioxide powder of the present invention is 0.0001-0.05 wt. %, 0.001-0.01 wt. % or 0.002-0.005 wt. %.

The crystalline titanium dioxide powder of the present invention may further comprise one or more residues of chloride. The crystalline titanium dioxide powder of the present invention preferably has a chloride content of less than 0.1 wt. %. The crystalline titanium dioxide powder preferably has a chloride content of 0.01-0.05 wt. %.

The tamped density of the crystalline titanium dioxide powder of the present invention is not particularly limited. However, the crystalline titanium dioxide powder of the present invention advantageously has a tamped density of 20-200 g/L, 30-190 g/L, 40-180 g/L, 50-170 g/L, 60-160 g/L, 70-150 g/L, 80-140 g/L, 90-130 g/L or 100-120 g/L. A tamped density of 30-120 g/L is particularly preferred.

The present invention also provides a process for preparing a crystalline titanium dioxide ($TiO_2$) powder, wherein the process comprises:

introducing a titanium tetrachloride ($TiCl_4$) vapor and, separately therefrom, hydrogen ($H_2$) and a primary air into a mixing chamber to produce a gaseous mixture, wherein the primary air comprises air and/or oxygen enriched air;

igniting the gaseous mixture comprising $TiCl_4$ vapor, $H_2$ and primary air in a burner to produce a flame, which is burned into a reaction chamber to produce the crystalline $TiO_2$ powder and gaseous substances; and separating the crystalline $TiO_2$ powder from the gaseous substances, wherein the relative amounts of $TiCl_4$ vapor, hydrogen and primary air are selected to provide crystalline $TiO_2$ powder having a BET surface area of 70-100 m$^2$/g and a rutile content of greater than 10% but less than or equal to 40%, with the proviso that factor A has a value of 0.1-0.4 g/m$^2$ or 0.2-0.3 g/m$^2$ in accordance within the following formula:

factor $A=10^5\{[(TiCl_4 \text{ vapor} \times H_2)/(\text{amount of air} \times \text{gaseous mixture})]/BET]\}$ wherein $TiCl_4$, $H_2$, amount of air and gaseous mixture are in units of kmol/h, BET surface area is in units of m$^2$/g, and factor A is in units of g/m$^2$.

The total gas comprises a gaseous mixture comprising titanium tetrachloride vapor, hydrogen, and a primary air, which comprises air and/or oxygen enriched air. The gaseous mixture may further comprise a secondary air, which comprises air and/or oxygen enriched air. Titanium tetrachloride is preferably vaporized at temperatures of less than 200° C., for example 136° C.

The process of the present invention may also be carried out with in addition to the primary air, a secondary air being introduced into the mixing chamber and/or ignited in the burner and burned into the reaction chamber, wherein the volume ratio of primary air to secondary air is between 10:1 and 0.1:1, between 7.25:1 and 0.2:1, between 4.5:1 and 0.3:1 or between 1.75:1 to 0.4:1. In order to promote the metering of a precise amount of secondary air, the flame is preferably burned into a reaction chamber that is sealed off from the surrounding air.

The process of the present invention may be carried out with the primary air and/or the secondary air being enriched with oxygen. In addition to, or in the alternative, the process of the present invention may be carried out with the primary air and/or the secondary air being preheated to a temperature of 50-500° C., 100-450° C., 150-400° C., 200-350° C. or 250-300° C.

Titanium dioxide prepared by flame hydrolysis in accordance with the present invention may be obtained by introducing gaseous starting materials in a stoichiometric amount such that the amount of hydrogen introduced is at least sufficient to react with the chloride of titanium tetrachloride to form hydrochloric acid. The amount of hydrogen required for this reaction is referred to as the stoichiometric amount of hydrogen. The ratio of the amount of hydrogen introduced to the stoichiometric amount of hydrogen required is referred to as gamma (γ) in accordance with the following equation:

gamma(γ)=$H_2$ introduced (mole)/stoichiometric $H_2$(mole).

The process of the present invention is carried out at a gamma (γ) value of 1-9, 2-8, 3-7 or 4-6.

Titanium dioxide prepared by flame hydrolysis in accordance with the present invention may be obtained by introducing gaseous starting materials in a stoichiometric amount such that the amount of oxygen introduced, for example as a primary air and/or a secondary air, is at least sufficient to react with the titanium of titanium tetrachloride to form titanium dioxide and convert any excess unreacted hydrogen into water. The amount of oxygen required for this reaction is referred to as the stoichiometric amount of oxygen. The ratio of the amount of oxygen introduced to the stoichiometric amount of oxygen required is referred to as lambda ($\lambda$) in accordance with the following equation:

lambda ($\lambda$)=$O_2$ introduced (mole)/stoichiometric $O_2$(mole).

The process of the present invention is carried out at a lambda ($\lambda$) value of 1-9, 2-8, 3-7 or 4-6.

The process of the present invention may further comprise steam treating the crystalline $TiO_2$ powder, after separating the crystalline $TiO_2$ powder from the gaseous substances, with steam and an optional air. The steam treating may be carried out at a temperature of 250-750° C., 300-700° C., 350-650° C., 400-600° C. or 450-550° C. Steam treating serves a number of purposes, including for example, removing unreacted chloride from the surface of the crystalline $TiO_2$ powder and/or reducing the number of agglomerates. The process of the present invention may be carried out by continuously treating the crystalline $TiO_2$ powder, from which the gaseous substances have been separated off, with steam and optional air, which is/are flowing in a concurrent or countercurrent direction.

The present invention also provides a catalyst and/or a catalyst support comprising the crystalline titanium dioxide powder having a variable sintering stability. The crystalline titanium dioxide powder having a variable sintering stability in accordance with the present invention may also be used in the ceramics industry.

The above written description is provided to thereby enable a skilled artisan to practice the invention described and claimed herein. Various modifications to the exemplary aspects will be readily apparent to those skilled in the art, and general principles and features defined herein may be applied to other non-exemplified aspects without departing from the spirit and scope of the present invention. Thus, the present invention is not intended to be limited to the aspects exemplified herein, but is to be accorded the broadest reasonable scope consistent with the general principles and features disclosed herein.

Having generally described the present invention, a further understanding can be obtained by reference to specific examples, which are provided herein merely for illustration purposes only, and are not intended to be limiting unless otherwise specified.

EXAMPLES

Analytical Methods

The BET surface area was determined in accordance with DIN 66131.

The tamped density was determined by a method based on DIN ISO 787/XI K 5101/18 (not sieved).

The bulk density was determined in accordance with DIN ISO 787/XI.

The pH was determined by a method based on DIN ISO 787/IX, ASTM D 1280, JIS K 5101/24.

The proportion of particles larger than 45 μm was determined in accordance with DIN ISO 787/XVIII, JIS K 5101/20.

Determination of the chloride content within the crystalline titanium dioxide powder of the present invention was carried out at follows: 0.3 g of the crystalline titanium dioxide powder was admixed with 20 mL of a 20% sodium hydroxide solution (analytical reagent), dissolved and introduced while stirring into 15 mL of cooled nitric acid ($HNO_3$). The chloride content of the solution was titrated with a silver nitrate ($AgNO_3$) solution at a concentration of 0.1 mol/L or 0.01 mol/L.

Example 1

0.0032 kmol/h of $TiCl_4$ vapor was introduced into a mixing chamber. Separately therefrom, 0.022 kmol/h of hydrogen and 0.240 kmol/h of a primary air were introduced into the mixing chamber. The reaction mixture was fed into a burner and ignited. The flame was burned into a water-cooled flame tube. In addition, 0.535 kmol/h of a secondary air was introduced into the reaction space. The crystalline titanium dioxide powder thus formed was isolated in a downstream filter and subsequently treated with steam and air flowing in a countercurrent direction at a temperature of 520° C.

A calculated value of 0.116 g/m² was determined for factor A.

The crystalline titanium dioxide powder had a BET surface area of 98 m²/g and a rutile content of 11%.

Examples 2-5

Examples 2 to 5 were carried out in a manner analogous to that described in Example 1. The respective amounts of the starting materials, the BET surface area and the rutile content of the crystalline titanium dioxide powders thus obtained are reported in Table 1.

Comparative Examples 1-12

Comparative Examples 1-12 were carried out in a manner analogous to that described in Example 1, with the exception that the respective amounts of starting materials were selected so that the factor A had a calculated value outside the range according to the present invention. The resultant titanium dioxide powders had BET surface areas and/or rutile contents outside the range according to the present invention.

Comparative Example 11 is a titanium dioxide powder commercially available from Evonik Degussa under the registered trademark Aeroxide® $TiO_2$ P25.

Comparative Example 12 is a titanium dioxide powder commercially available from Evonik Degussa under the registered trademark Aeroxide® $TiO_2$ VP P90.

Table 2 illustrates that the crystalline titanium dioxide powders of Examples 2 and 3 according to the present invention, which have a comparable BET surface area, but a different rutile content, display significantly different sintering stabilities (i.e., variable sintering stabilities). In regard to the crystalline titanium dioxide powders of the present invention, increasing the rutile content generally results in a higher sintering stability. In contrast, the titanium oxide powders of Comparative Examples 4 and 11, which have a comparable BET surface area, but a different rutile content, display barely any difference in sintering stability (i.e., high sintering stability).

TABLE 1

(Amounts of Starting Material; BET Surface Area and Rutile Content of TiO$_2$ Powder Produced)

| Example | TiCl$_4$ kmol/h | H$_2$ kmol/h | Air Primary kmol/h | Air Secondary kmol/h | Air Total kmol/h | Total O$_2$ kmol/h | Total gas kmol/h | gamma | lambda | A g/m$^2$ | Rutile % | BET m$^2$/g |
|---|---|---|---|---|---|---|---|---|---|---|---|---|
| 1 | 0.003 | 0.022 | 0.240 | 0.535 | 0.775 | 0.163 | 0.800 | 3.460 | 4.520 | 0.116 | 11 | 98 |
| 2 | 0.007 | 0.020 | 0.210 | 0.535 | 0.745 | 0.156 | 0.772 | 1.490 | 4.490 | 0.306 | 14 | 75 |
| 3 | 0.007 | 0.027 | 0.223 | 0.535 | 0.758 | 0.159 | 0.792 | 2.030 | 3.500 | 0.386 | 20 | 77 |
| 4 | 0.137 | 1.370 | 16.670 | 5.800 | 22.470 | 4.719 | 23.977 | 5.000 | 5.000 | 0.367 | 35 | 95 |
| 5 | 0.137 | 1.370 | 12.441 | 15.530 | 27.971 | 5.874 | 29.478 | 5.000 | 3.800 | 0.312 | 28 | 73 |
| C1 | 0.137 | 1.885 | 15.951 | 5.800 | 21.751 | 4.568 | 23.773 | 6.880 | 3.550 | 0.549 | 7 | 91 |
| C2 | 0.005 | 0.067 | 0.120 | 0.419 | 0.539 | 0.113 | 0.611 | 6.350 | 0.760 | 3.992 | 8 | 27 |
| C3 | 0.008 | 0.067 | 0.161 | 0.419 | 0.580 | 0.122 | 0.655 | 4.240 | 1.010 | 4.495 | 26 | 31 |
| C4 | 1.920 | 6.100 | 47.120 | 15.530 | 62.650 | 13.157 | 70.670 | 1.590 | 3.270 | 5.187 | 16 | 51 |
| C5 | 1.920 | 5.430 | 47.460 | 15.530 | 62.990 | 13.228 | 70.340 | 1.410 | 3.680 | 4.614 | 12 | 51 |
| C6 | 1.920 | 6.100 | 48.150 | 22.510 | 70.660 | 14.839 | 78.680 | 1.590 | 3.310 | 4.213 | 15 | 50 |
| C7 | 0.042 | 0.190 | 0.683 | 0.892 | 1.575 | 0.331 | 1.807 | 2.250 | 1.510 | 8.247 | 54 | 34 |
| C8 | 0.042 | 0.127 | 0.446 | 0.803 | 1.249 | 0.262 | 1.418 | 1.510 | 1.470 | 8.858 | 57 | 34 |
| C9 | 0.042 | 0.190 | 0.455 | 0.803 | 1.258 | 0.264 | 1.490 | 2.250 | 1.010 | 11.203 | 66 | 38 |
| C10 | 0.042 | 0.127 | 0.306 | 0.803 | 1.109 | 0.233 | 1.278 | 1.510 | 1.010 | 10.753 | 65 | 35 |
| C11* | 1.920 | 6.540 | 48.410 | 15.230 | 63.640 | 13.364 | 72.100 | 1.700 | 3.100 | 5.366 | 23 | 49 |
| C12* | 0.137 | 2.070 | 20.350 | 4.900 | 25.250 | 5.303 | 27.457 | 7.560 | 4.100 | 0.455 | 5 | 90 |

C11* Aeroxide ® TiO$_2$ P25
C12* Aeroxide ® TiO$_2$ VP P90

TABLE 2

(Sintering Stability)

| TiO$_2$ Powder of Example | Rutile % | TiO2 Powder Produced m$^2$/g | BET TiO2 Powder Sintered at 600° C. for 3 hours m$^2$/g | Decrease % |
|---|---|---|---|---|
| 2 | 14 | 75 | 52 | 31 |
| 3 | 20 | 77 | 60 | 22 |
| C4 | 16 | 50 | 42 | 16 |
| C11 | 23 | 49 | 40 | 18 |

Numerous modifications and variations on the present invention are obviously possible in light of the above disclosure and thus the present invention may be practiced otherwise than as specifically described herein without departing from spirit and scope of the present invention. Accordingly, it is therefore to be understood that the foregoing disclosure is merely illustrative of exemplary aspects of the present invention and that numerous modifications and variations can be readily made by skilled artisans that fall within the scope of the accompanying claims.

The invention claimed is:

1. A process for preparing a crystalline titanium dioxide powder in the form of aggregated primary particles having a variable sintering stability at a BET surface area of 80-90 m$^2$/g and a rutile content of 16-30%, wherein the process comprises:
   introducing a titanium tetrachloride (TiCl$_4$) vapor and, separately therefrom, hydrogen (H$_2$) and a primary air into a mixing chamber to produce a gaseous mixture, wherein the primary air comprises air and/or oxygen enriched air;
   igniting the gaseous mixture comprising TiCl$_4$ vapor, H$_2$ and primary air in a burner to produce a flame, which is burned into a reaction chamber to produce the crystalline titanium dioxide powder and gaseous substances; and
   separating the crystalline titanium dioxide powder from the gaseous substances,
   wherein the relative amounts of TiCl$_4$ vapor, H$_2$ and primary air are selected to provide crystalline titanium dioxide powder having a BET surface area of 80-90 m$^2$/g and a rutile content of 16-30%,
   with the proviso that factor A has a value of 0.1-0.4 g/m$^2$ in accordance within the following formula:

$$\text{factor } A = 10^5 \{[(\text{TiCl}_4 \text{ vapor} \times \text{H}_2)/(\text{amount of air} \times \text{gaseous mixture})]/\text{BET}]\}$$

wherein TiCl$_4$, H$_2$, amount of air and gaseous mixture are in units of kmol/h, BET surface area is in units of m$^2$/g, and factor A is in units of g/m$^2$, and
   wherein the variable sintering stability is represented by a decrease in BET surface area of 20-90%, based on an original BET surface area prior to sintering.

2. The process according to claim 1, wherein the process further comprises introducing a secondary air into the mixing chamber,
   wherein
   the secondary air comprises air and/or oxygen enriched air,
   a volume ratio of primary air to secondary air is between 10:1 and 0.1:1, and
   the primary air and/or the secondary may optionally be preheated to a temperature of 50-500° C.

3. The process according to claim 2, wherein the volume ratio of primary air to secondary air is between 4.5:1 and 0.3:1.

4. The process according to claim 1, wherein the process further comprises igniting in the burner and burning into the reaction chamber a secondary air,
   wherein
   the secondary air comprises air and/or oxygen enriched air,
   a volume ratio of primary air to secondary air is between 10:1 and 0.1:1, and
   the primary air and/or the secondary may optionally be preheated to a temperature of 50-500° C.

5. The process according to claim 4, wherein the volume ratio of primary air to secondary air is between 4.5:1 and 0.3:1.

6. The process according to claim 1, wherein a ratio of the amount of hydrogen introduced to a stoichiometric amount of hydrogen required to react with chloride of titanium tetrachloride to form hydrochloric acid is referred to as gamma (γ) in accordance with the following equation:

$$\text{gamma }(\gamma) = H_2 \text{ introduced (mole)/stoichiometric } H_2 \text{ (mole)}$$

wherein gamma (γ) has a value of 1-9.

7. The process according to claim 1, wherein a ratio of the amount of oxygen introduced to a stoichiometric amount of oxygen required to react with titanium of titanium tetrachloride to form titanium dioxide and convert any excess unreacted hydrogen to water is referred to as lambda (λ) in accordance with the following equation:

$$\text{lambda }(\lambda) = O_2 \text{ introduced (mole)/stoichiometric } O_2 \text{ (mole).}$$

wherein lambda (λ) has a value of 1-9.

8. The process according to claim 1, wherein the process further comprises steam treating the crystalline $TiO_2$ powder, after separating the crystalline $TiO_2$ powder from the gaseous substances, with steam and an optional air.

9. The process according to claim 8, wherein the steam and the optional air, which is present, are flowing in a concurrent direction or a countercurrent direction.

10. The process according to claim 8, wherein the steam treating is carried out at a temperature of 250-750° C.

11. The process according to claim 8, wherein the variable sintering stability is represented by a decrease in BET surface area of 20-30%, based on an original BET surface area prior to sintering.

12. The process according to claim 8, wherein the variable sintering stability is represented by a decrease in BET surface area of 30-40%, based on an original BET surface area prior to sintering.

13. The process according to claim 8, wherein the variable sintering stability is represented by a decrease in BET surface area of 40-50%, based on an original BET surface area prior to sintering.

14. The process according to claim 8, wherein the variable sintering stability is represented by a decrease in BET surface area of 50-60%, based on an original BET surface area prior to sintering.

15. The process according to claim 8, wherein the variable sintering stability is represented by a decrease in BET surface area of 60-70%, based on an original BET surface area prior to sintering.

16. The process according to claim 8, wherein the variable sintering stability is represented by a decrease in BET surface area of 70-80%, based on an original BET surface area prior to sintering.

17. The process according to claim 8, wherein the variable sintering stability is represented by a decrease in BET surface area of 80-90%, based on an original BET surface area prior to sintering.

18. The process according to claim 8, wherein the variable sintering stability is represented by a decrease in BET surface area of 30-80%, based on an original BET surface area prior to sintering.

19. The process according to claim 8, wherein the variable sintering stability is represented by a decrease in BET surface area of 40-70%, based on an original BET surface area prior to sintering.

20. The process according to claim 8, wherein the variable sintering stability is represented by a decrease in BET surface area of 25-30%, based on an original BET surface area prior to sintering.

\* \* \* \* \*